United States Patent
Srivastava et al.

(10) Patent No.: US 9,461,538 B2
(45) Date of Patent: Oct. 4, 2016

(54) DC/DC CONVERTER

(71) Applicant: ABB Technology Ltd, Zürich (CH)

(72) Inventors: Kailash Srivastava, Västerås (SE);
Roberto Alves, Västerås (SE); Michal Lazarczyk, Krakow (PL)

(73) Assignee: ABB TECHNOLOGY LTD, Zürich (CH)

(*) Notice: Subject to any disclaimer, the term of this patent is extended or adjusted under 35 U.S.C. 154(b) by 0 days.

(21) Appl. No.: 15/023,895

(22) PCT Filed: Sep. 23, 2013

(86) PCT No.: PCT/EP2013/069742
§ 371 (c)(1),
(2) Date: Mar. 22, 2016

(87) PCT Pub. No.: WO2015/039708
PCT Pub. Date: Mar. 26, 2015

(65) Prior Publication Data
US 2016/0248321 A1 Aug. 25, 2016

(51) Int. Cl.
*H02M 3/156* (2006.01)
*H02M 3/158* (2006.01)
(Continued)

(52) U.S. Cl.
CPC ............ *H02M 3/155* (2013.01); *H02M 1/4266* (2013.01); *H02M 3/10* (2013.01); *H02M 3/156* (2013.01); *H02M 3/158* (2013.01); *H02M 3/24* (2013.01); *H02M 7/483* (2013.01)

(58) Field of Classification Search
CPC .... H02M 3/155; H02M 3/156; H02M 3/158; H02M 3/24; H02M 3/28; H02M 7/483; H02M 7/4835
See application file for complete search history.

(56) References Cited

U.S. PATENT DOCUMENTS 3,942,089 A 3/1976 Kanngiesser
9,065,328 B2* 6/2015 Papastergiou .......... H02J 1/102
(Continued)

FOREIGN PATENT DOCUMENTS

CN 102751891 A 10/2012
EP 2 621 076 A1 7/2013
(Continued)

OTHER PUBLICATIONS

Ferreira, "The Multilevel Modular DC Converter", IEEE Transactions on Power Electronics, Oct. 2013, vol. 28, No. 10, pp. 4460-4465.

*Primary Examiner* — Timothy J Dole
*Assistant Examiner* — Ishrat Jamali
(74) *Attorney, Agent, or Firm* — Birch, Stewart, Kolasch & Birch, LLP

(57) ABSTRACT

It is presented a DC/DC converter for converting power between a first DC connection comprising a first positive terminal and a first negative terminal, and a second DC connection comprising a second positive terminal and a second negative terminal. The DC/DC converter comprises: a first multilevel converter and a second multilevel converter connected serially between the first positive terminal and the first negative terminal, wherein the second positive terminal is connected to a point between the first multilevel converter and the second multilevel converter; and a first filter connected between an AC terminal of the first multilevel converter and an AC terminal of the second multilevel converter, wherein the first filter comprises a capacitor and an inductor.

20 Claims, 4 Drawing Sheets

(51) Int. Cl.
    *H02M 3/155* (2006.01)
    *H02M 7/483* (2007.01)
    *H02M 3/10* (2006.01)
    *H02M 1/42* (2007.01)
    *H02M 3/24* (2006.01)

(56) References Cited

U.S. PATENT DOCUMENTS

2009/0021966 A1  1/2009  Jacobson et al.
2011/0261598 A1* 10/2011 Harnefors ............ H02M 1/126
                                                        363/40
2012/0113702 A1  5/2012  Rigbers
2013/0003431 A1  1/2013  Reddy

FOREIGN PATENT DOCUMENTS

WO   WO 2013/017160 A1   2/2013
WO   WO 2013/071962 A1   5/2013
WO   WO 2013/075735 A1   5/2013

* cited by examiner

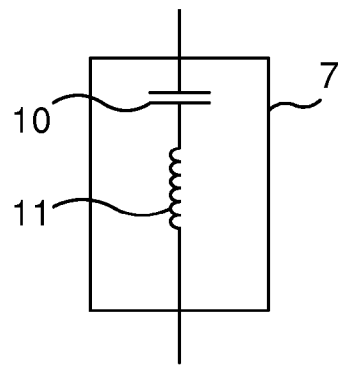
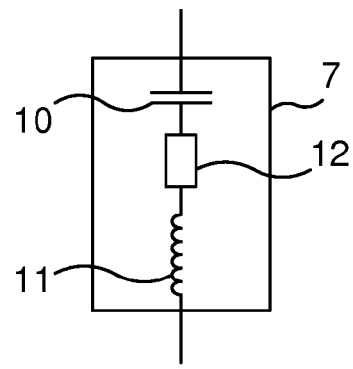
Fig. 3A          Fig. 3B
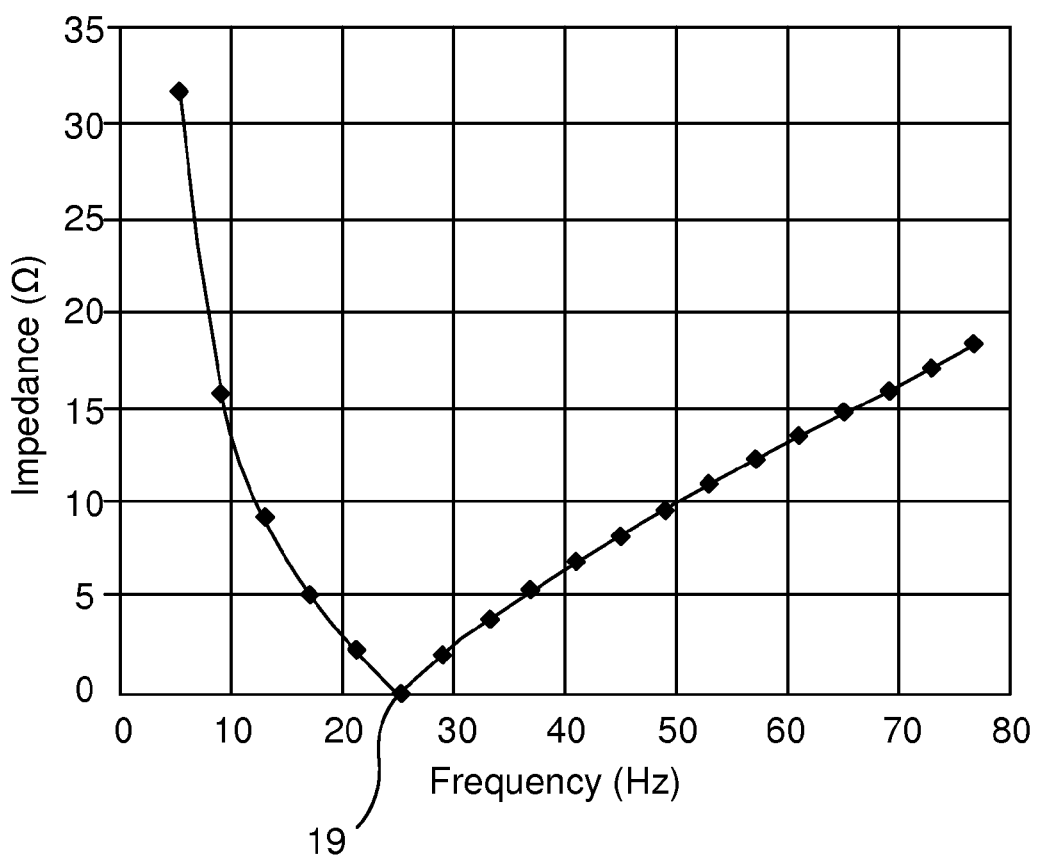
Fig. 4

DC/DC CONVERTER

TECHNICAL FIELD

The invention relates to a DC/DC converter for converting power between a first DC (Direct Current) connection and a second DC connection.

BACKGROUND

DC/DC converters are useful for several purposes. For high voltage DC (HVDC), DC/DC converters can be used to transfer power unidirectionally or bidirectionally between two DC grids.

U.S. Pat. No. 3,942,089 presents a transmission substation for transforming a high D.C. voltage over an intermediate three phase A.C. network into a lower D.C. voltage. The substation includes an arrangement of inverters and rectifiers for effecting the transformation. The inverters and rectifiers are connected to a common bus bar via respective transformers. The transformers are used to adjust and match the voltage levels of the converter bridges as well as for preventing flow of DC current through bus bar. However, when compared to a typical HVDC transformer, additional isolation is required because the transformer is floating and is subjected to high DC voltage stress in steady state on both sides. This implies significant cost and/or additional protection systems.

SUMMARY

According to a first aspect, it is presented a DC/DC converter for converting power between a first DC connection comprising a first positive terminal and a first negative terminal, and a second DC connection comprising a second positive terminal and a second negative terminal. The DC/DC converter comprises: a first multilevel converter and a second multilevel converter connected serially between the first positive terminal and the first negative terminal, wherein the second positive terminal is connected to a point between the first multilevel converter and the second multilevel converter; and a first filter connected between an AC terminal of the first multilevel converter and an AC terminal of the second multilevel converter, wherein the first filter comprises a capacitor and an inductor.

By employing the filter between the AC terminals, the capacitor blocks any DC current and the inductor provides suitable decoupling between the AC connections of the multilevel converters allowing independent control of the multilevel converters. Also, the use of multilevel converters allows a bidirectional power flow through the DC/DC converter and provides increased reliability since a certain number of converter cells of the multilevel converter can fail without affecting the function of the DC/DC converter. No transformer is needed in the filter, whereby the frequency on the AC terminals can be selected arbitrarily. E.g. by increasing the frequency, an inductor with reduced inductance can be selected, saving cost and space.

The first negative terminal and the second negative terminal may be connected to ground. This provides an asymmetric DC/DC converter.

The DC/DC converter may further comprise: a third multilevel converter and a fourth multilevel converter connected serially between the second multilevel converter and the first negative terminal, wherein the second negative terminal is connected to a point between the third multilevel converter and the fourth multilevel converter; and a second filter connected between an AC terminal of the third multilevel converter and an AC terminal of the fourth multilevel converter, wherein the second filter comprises a capacitor and an inductor. In this way, a symmetric DC/DC converter is provided.

For the first filter and the second filter when present, the inductor may be a reactor component.

For the first filter and the second filter when present, the inductor may be implemented by a parasitic inductance.

The first filter and the second filter when present, may comprise a resistor. In this way, the first and second filter can be RLC filters.

A main resonance frequency of the first filter and the second filter, when present, may be less than the frequency provided on the AC terminals of the multilevel converters.

An impedance of the first filter and the second filter, when present, may be at a minimum at its respective main resonance frequency.

The capacitor of the first filter and the second filter when present, may block DC through the respective filter. The difference in DC voltage between the AC terminals can be very large, whereby the capacitor blocks any DC current between the AC terminals.

Each multilevel converter may comprise a plurality of converter cells.

Each one of the converter cells may comprise at least one switching element and at least one energy storage element. For example, each one of the converter cells can be a full bridge converter cell or a half bridge converter cell.

It is to be noted that whenever used in the claims and description, the terms positive and negative are to be interpreted as mutually relative terms and not absolute.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 3A-B are schematic diagrams illustrating embodiments of the filters of FIGS. 1 and 2;

FIG. 4 is a schematic graph illustrating an example of impedance of the filters of FIGS. 1 and 2;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
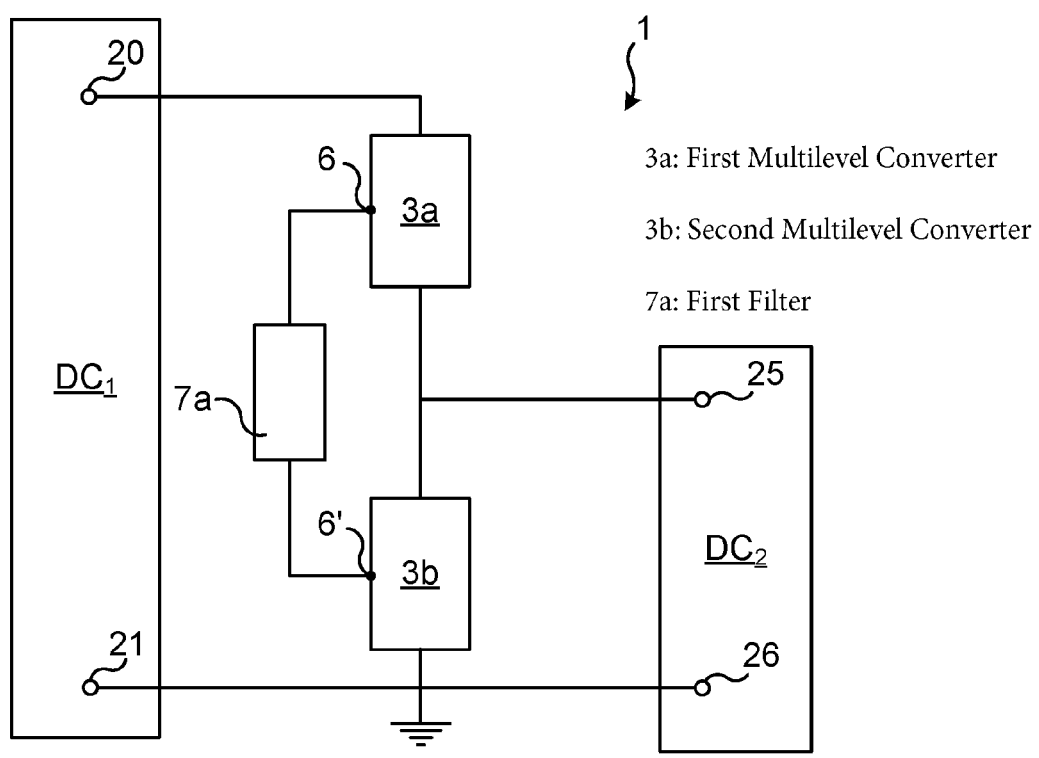
FIG. 1 is a schematic diagram illustrating an asymmetric DC/DC converter according to one embodiment.

FIG. 1 is a schematic diagram illustrating an asymmetric DC/DC converter 1 according to one embodiment. 1. The DC/DC converter 1 is used for converting power between a first DC connection $DC_1$ and a second DC connection $DC_2$, e.g. for HVDC applications such as connecting two HVDC grids for unidirectional or bidirectional power transfer. The first DC connection $DC_1$ comprises a first positive terminal 20 and a first negative terminal 21. The second DC connection $DC_2$ comprises a second positive terminal 25 and a second negative terminal 26.

The DC/DC converter 1 comprises a first multilevel converter 3a and a second multilevel converter 3b connected serially between the first positive terminal 20 and the first negative terminal 21. The second positive terminal 25 is connected to a point between the first multilevel converter 3a and the second multilevel converter 3b. In this embodiment, the first negative terminal 21 and the second negative terminal 26 are both connected to ground. Hence, an asymmetric DC/DC converter is achieved.

A filter 7a is connected between an AC terminal 6 of the first multilevel converter 3a and an AC terminal 6' of the second multilevel converter 3b. At least two AC phases of the two multilevel converters 3a and 3b are connected to each other through the filter 7a. The filter 7a, as explained in more detail below with reference to FIGS. 3A-B, comprises a capacitor and an inductor. Significantly, there is no transformer in the filter 7a. A transformer in the filter 7a would result in DC voltage stresses from the two sides. Moreover, such a transformer would be floating (not grounded).

The filter 7a, linking the AC sides 6, 6' allows energy to flow between the first multilevel converter 3a and the second multilevel converter 3b, to balance capacitors in converter cells of the multilevel converters 3a-b. The filter 7a is a passive filter and manages the difference in DC levels of the two multilevel converters 3a-b. This can e.g. be achieved by a DC blocking capacitor of the filter 7a.

It is to be noted that as long as any resonance frequency (see FIG. 4) of the filter 7a is less than the AC frequency on the AC sides of the multilevel converters, the AC frequency of the AC sides can be chosen freely. This is due to there not being any transformers or AC grid connected to the AC sides of the multilevel converters. For example, the AC frequency can be controlled to be 100 Hz or even more, which significantly reduces impedance requirements on inductors in the connection between the two AC sides, since a higher frequency over an inductor increases impedance. Lowering impedance requirements on inductors has a great effect on complexity and cost when applied at large voltages, such as in an HVDC environment where the size and cost of inductors have great impact.

Figure 2:
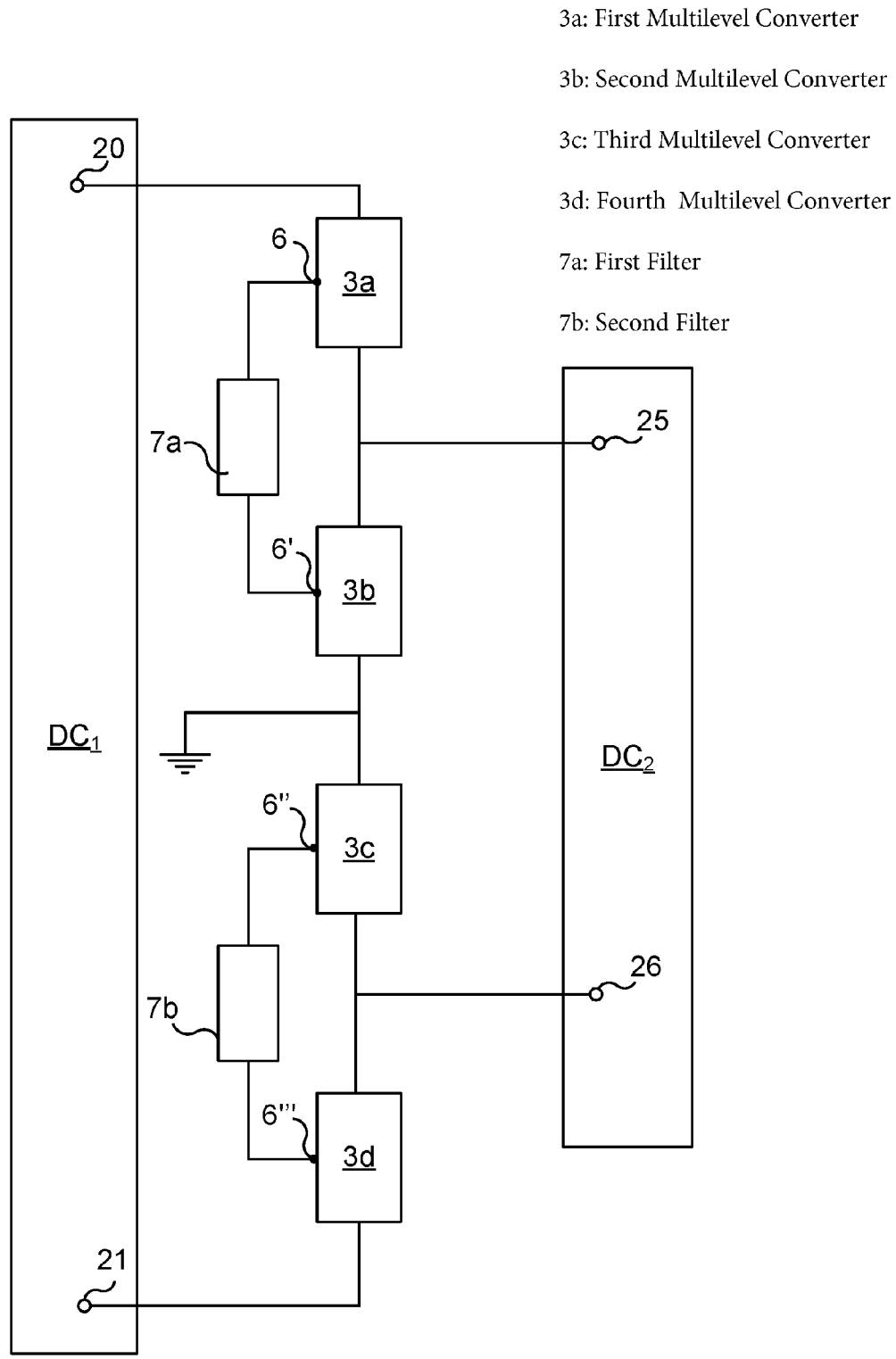
FIG. 2 is a schematic diagram illustrating a symmetric DC/DC converter according to one embodiment.

FIG. 2 is a schematic diagram illustrating a symmetric DC/DC converter according to one embodiment. In this embodiment, compared to the embodiment of FIG. 1, the DC/DC converter further comprises: a third multilevel converter 3c and a fourth multilevel converter 3d connected serially between the second multilevel converter 3b and the first negative terminal 21. In order to achieve symmetry, the second negative terminal 26 is connected to a point between the third multilevel converter 3c and the fourth multilevel converter 3d.

The filter 7a between the first multilevel converter 3a and the second multilevel converter 3b is referred to as a first filter. Furthermore, a second filter 7b is connected between an AC terminal 6″ of the third multilevel converter 3c and an AC terminal 6‴ of the fourth multilevel converter 3d. Also the second filter 7b comprises a capacitor and an inductor.

The structure of the DC/DC converter of FIG. 2 thus provides a symmetric DC/DC converter. This implies that the voltages of the first positive terminal 20 and the first negative terminal 21 are provided symmetrically about ground (zero) and that the voltages of the second positive terminal 25 and the second negative terminal 26 are provided symmetrically about ground (zero).

FIGS. 3A-B are schematic diagrams illustrating embodiments of the filters of FIGS. 1 and 2, here represented by a single filter 7.

In FIG. 3A, the filter 7 is an LC filter comprising a capacitor 10 connected serially with an inductor 11. The capacitor 10 blocks DC through the filter 7, i.e. providing DC isolation between the two terminals of the filter 7. The inductor 11 is provided to make the impedance over the filter 7 inductive at the frequency of the AC connections. The inductive impedance is needed to provide the power transfer between the multilevel converters. The inductor 11 could be implemented using one or more reactor components, or the inductor 11 could be implemented using parasitic inductance e.g. of cables. The magnitude of inductance required will depend of the fundamental frequency of the AC connections.

A decoupling between the AC connections of the multilevel converters allows independent control of the multilevel converters. This decoupling is obtained by the inductor 11 of the filter 7. Transformed power control can be achieved by controlling the multilevel converters, to provide a suitable angle of the AC voltages through of the inductive coupling.

In FIG. 3B, the filter 7 is an RLC filter, also comprising a resistor 12 to achieve desired impedance of the filter. The resistor 12 could be a resistor component or intrinsic resistance of other entities such as cables, etc.

The filter could also be implemented in any other suitable way, as long as it is able to handle the significant DC voltage difference between the AC connections of the multilevel converters it connects to. The filter design and the parameters of its components depend on the fundamental frequency of the AC connections, of the switching frequencies of the multilevel converters and of the DC voltages.

FIG. 4 is a schematic graph illustrating an example of impedance of one example of the filters of FIGS. 1 and 2. In this non-limiting example, the filter is an RLC filter where the parameters of RLC circuit were chosen as follows: $R=0.1\Omega$, $L=0.042$ H, $C=965$ µF.

The frequency response of RLC filter having parameters as above is shown in FIG. 4. This filter offers large impedance for DC and low frequencies, near DC, due to the capacitor. The impedance offered at 50 Hz is around $10\Omega$ inductive to permit power transfer.

The main resonance frequency 19 of the RLC filter, where its impedance is at a minimum, is here at around 25 Hz, which is lower than a frequency provided at the AC ports of the multilevel converters of FIGS. 1 and 2.

Figure 5:
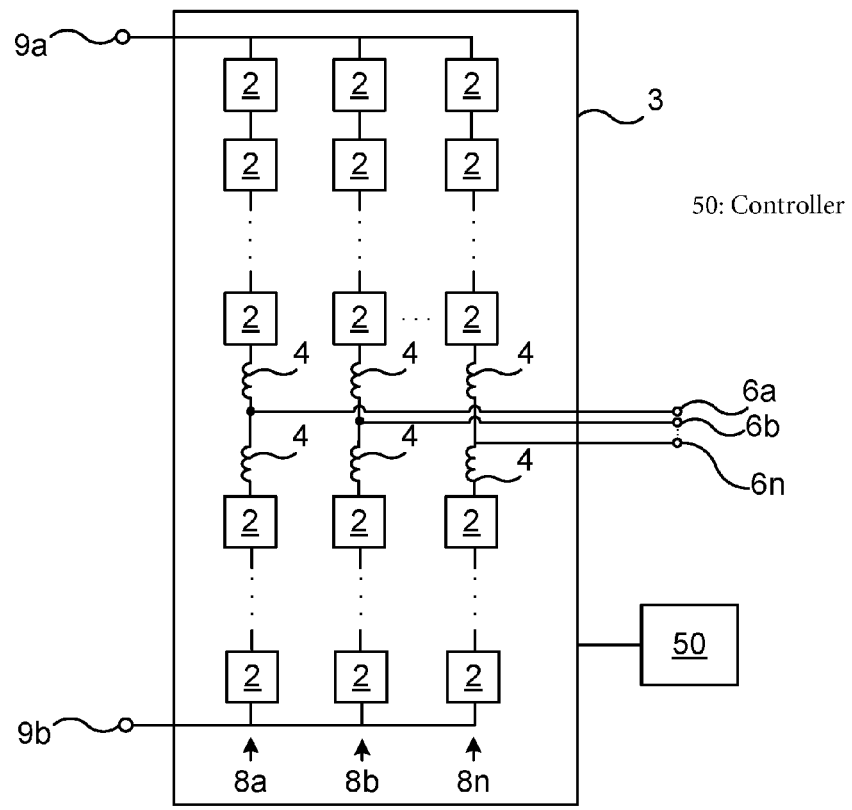
FIG. 5 is a schematic diagram illustrating an embodiment of the multilevel converters of FIGS. 1 and 2.

FIG. 5 is a schematic diagram illustrating an embodiment of the multilevel converters of FIGS. 1 and 2, here illustrated by a single multilevel converter 3. The multilevel converter 3 comprises a plurality of converter cells 2, wherein each converter cell 2 is controlled by a central controller 50, optionally via a local controller (not shown).

There are n phases 8*a-n*, where n is a number of two or more. For each phase, there is an upper converter arm and a lower converter arm, each comprising a number of serially connected converter cells 2. Between the upper and lower converter arms, there are inductors 4. Between the inductors 4 of each phase 8*a-n*, respective AC terminals 6*a-n* are provided. The inductors 4 are there to provide an AC current of sufficiently good quality.

By connecting the converter cells 2 serially, the converter cells 2 can be individually controlled to achieve a fine granularity in the AC conversion, e.g. to achieve a more sinusoidal (or square, saw tooth shaped, etc.) power conversion. Also, by controlling the serially connected converter cells 2 in this way, the switching frequency of each converter cell 2 is relatively low, which results in low switching losses in the converter cells 2 when compared to higher switching frequencies. Also, by over dimensioning the number of serially connected converter cells, a finite number of converter cells can fail without affecting the operation of the multilevel converter 3, since the failed cells typically fall into a predictable short circuit state.

The number of converter cells in each converter arm can be any suitable number.

Figures 6A, 6B, 6C:
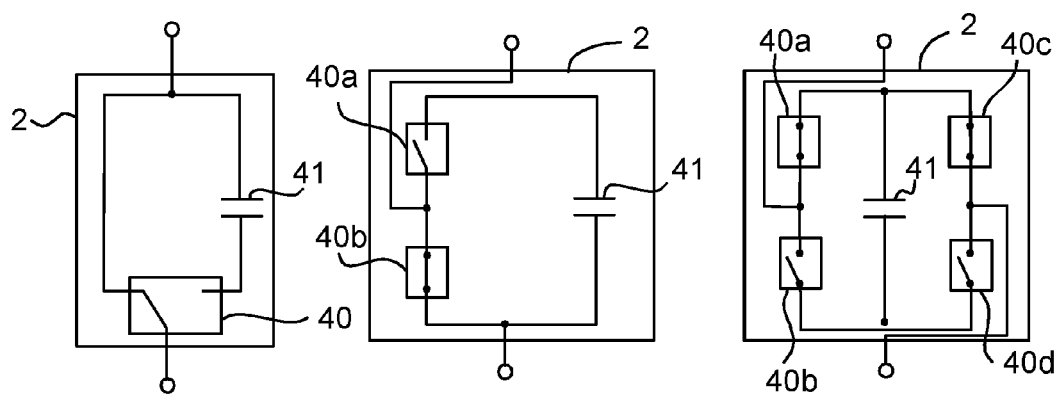
FIGS. 6A-C are schematic diagrams illustrating embodiments of converter cells of the multilevel converter of FIG. 5.

FIGS. 6A-C are schematic diagrams illustrating embodiments of converter cells 2 of the multilevel converter of FIG. 5. It is to be noted that the embodiments of FIGS. 6A-C are only examples and converter cells of any suitable structure forming part of a multilevel bridge configuration could be used.

A converter cell 2 is a combination of one or more semiconductor switching elements, such as transistors or thyristors, and one or more energy storing elements 41, such as capacitors, supercapacitors, inductors, batteries, etc. Optionally, a converter cell 2 can be a multilevel converter structure in itself, such as a flying capacitor or MPC (Multi-Point-Clamped) or ANPC (Active-Neutral-Point-Clamped) multilevel structure.

FIG. 6A illustrates a converter cell 2 comprising a switching element 40 and an energy storage element 41 in the form of a capacitor. The switching element 40 can for example be implemented using an insulated gate bipolar transistor (IGBT), Integrated Gate-Commutated Thyristor (IGCT), a Gate Turn-Off thyristor (GTO), or any other suitable high power semiconductor component. In fact, the converter cell 2 of FIG. 6A can be considered to be a more general representation of the converter cell shown in FIG. 6B, which will be described here next.

FIG. 6B illustrates a converter cell 2 implementing a half bridge structure. The converter cell 2 here comprises a leg of two serially connected switching elements 40*a-b*, e.g. in the form of IGBTs, IGCTs, GTOs, etc. Optionally, there is an antiparallel diode connected across each switching element 40*a-b* (not shown). An energy storage element 41 is also provided in parallel with the leg of switching elements 40*a-b*. The voltage synthesised by the converter cell 2 can thus either be zero or the voltage of the energy storage element 41.

FIG. 6C illustrates a converter cell 2 implementing a full bridge structure. The converter cell 2 here comprises four switching elements 40*a-d*, e.g. IGBTs, IGCTs, GTOs, etc. Optionally, there is an antiparallel diode connected across each switching element 40*a-d* (not shown). An energy storage element 41 is also provided in parallel across a first leg of two switching elements 40*a-b* and a second leg of two switching elements 40*c-d*. Compared to the half bridge of FIG. 6B, the full bridge structure allows the synthesis of a voltage capable of assuming both signs, whereby the voltage of the converter cell can either be zero, the voltage of the energy storage element 41, or a reversed voltage of the energy storage element 41.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A DC/DC converter for converting power between a first DC connection comprising a first positive terminal and a first negative terminal, and a second DC connection comprising a second positive terminal and a second negative terminal, the DC/DC converter comprising:
   a first multilevel converter and a second multilevel converter connected serially between the first positive terminal and the first negative terminal, wherein the second positive terminal is connected to a point between the first multilevel converter and the second multilevel converter; where each converter has n phases, where n is a number of two or more, and for each phase there is an upper converter arm and a lower converter arm, each comprising a number of serially connected converter cells, where there are inductors between the upper and lower converter arms and respective AC terminals are provided between the inductors of each phase, and
   a first filter connected between an AC terminal of the first multilevel converter and an AC terminal of the second multilevel converter, wherein the first filter comprises a capacitor and an inductor.

2. The DC/DC converter according to claim 1, wherein the first negative terminal is connected to ground and the second negative terminal is connected to ground.

3. The DC/DC converter according to claim 2, wherein for the first filter and the second filter when present, the inductor is a reactor component.

4. The DC/DC converter according to claim 2, wherein for the first filter and the second filter when present, the inductor is implemented by a parasitic inductance.

5. The DC/DC converter according to claim 2, wherein the first filter and the second filter when present, comprises a resistor.

6. The DC/DC converter according to claim 1, further comprising:
   a third multilevel converter and a fourth multilevel converter connected serially between the second multilevel converter and the first negative terminal, wherein the second negative terminal is connected to a point between the third multilevel converter and the fourth multilevel converter; and
   a second filter connected between an AC terminal of the third multilevel converter and an AC terminal of the fourth multilevel converter, wherein the second filter comprises a capacitor and an inductor.

7. The DC/DC converter according to claim 6, wherein for the first filter and the second filter when present, the inductor is a reactor component.

8. The DC/DC converter according to claim 6, wherein for the first filter and the second filter when present, the inductor is implemented by a parasitic inductance.

9. The DC/DC converter according to claim 6, wherein the first filter and the second filter when present, comprises a resistor.

10. The DC/DC converter according to claim 1, wherein for the first filter and the second filter when present, the inductor is a reactor component.

11. The DC/DC converter according to claim 10, wherein for the first filter and the second filter when present, the inductor is implemented by a parasitic inductance.

12. The DC/DC converter according to claim 10, wherein the first filter and the second filter when present, comprises a resistor.

13. The DC/DC converter according to claim 1, wherein for the first filter and the second filter when present, the inductor is implemented by a parasitic inductance.

14. The DC/DC converter according to claim 13, wherein the first filter and the second filter when present, comprises a resistor.

15. The DC/DC converter according to claim 1, wherein the first filter and the second filter when present, comprises a resistor.

16. The DC/DC converter according to claim 1, wherein a main resonance frequency of the first filter and the second filter, when present, is less than the frequency provided on the AC terminals of the multilevel converters.

17. The DC/DC converter according to claim 1, wherein an impedance of the first filter and the second filter, when present, is at a minimum at its respective main resonance frequency.

18. The DC/DC converter according to claim 1, wherein the capacitor of the first filter and the second filter when present, blocks DC through the respective filter.

19. The DC/DC converter according to claim 1, wherein each multilevel converter comprises a plurality of converter cells.

20. The DC/DC converter according to claim 19, wherein each one of the converter cells comprises at least one switching element and at least one energy storage element.

* * * * *